Dec. 19, 1939.         A. F. KENYON         2,183,993
OPERATION OF DYNAMO-ELECTRIC MACHINES
Filed Jan. 26, 1939
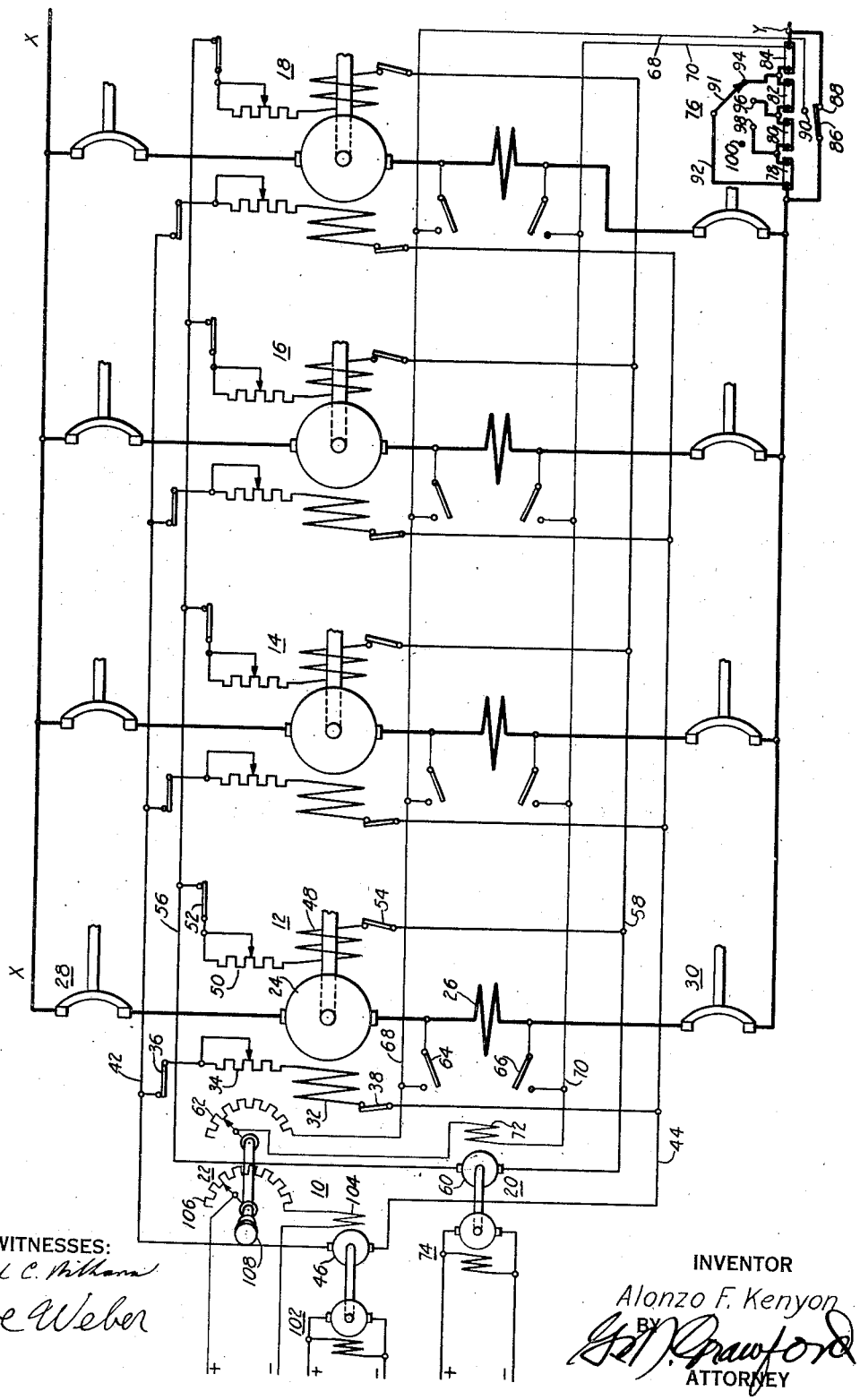
WITNESSES:
INVENTOR
Alonzo F. Kenyon
BY
ATTORNEY Patented Dec. 19, 1939

2,183,993

UNITED STATES PATENT OFFICE 2,183,993

OPERATION OF DYNAMO-ELECTRIC MACHINES

Alonzo F. Kenyon, Wilkinsburg, Pa., assignor to Westinghouse Electric & Manufacturing Company, East Pittsburgh, Pa., a corporation of Pennsylvania Application January 26, 1939, Serial No. 252,921

19 Claims. (Cl. 171—224)

My invention relates, generally, to the operation of dynamo-electric machines and, more particularly, to a system for so operating a plurality of direct current generators in parallel as to provide the desired load division between the generators and to provide the desired voltage-load characteristics for the generators.

The power supply for the roll driving motors of metal rolling mills is commonly provided by a plurality of direct current generators connected in parallel to a common bus. The speed of the mill motors energized from this common bus may be controlled by variation of the generator potential by means of generator field control.

It is necessary to proportion the load between the several generators and also to vary the output potential of the generators through a wide range to provide the required mill motor speed range. It is desirable that the generators have a certain voltage-load characteristic at each of the voltages throughout the operating range of the generators to insure stable operation throughout this range.

An object of my invention, therefore, is to provide an operating system for a plurality of direct current generators which shall function to properly divide the load between the generators, to permit a wide range of voltage variation of the generators and to produce predetermined voltage-load characteristics at each of the several voltages throughout the range of voltage variation of the generators.

A further object of the invention is to provide an operating system for a plurality of parallel connected generators which shall function to control the load division, voltage and voltage-load characteristics of the generators, and which shall be simple and efficient in operation and inexpensive to manufacture, install, maintain and operate.

These and other objects and advantages of my invention will be readily apparent from the following detailed description taken in connection with the accompanying drawing in which the single figure is a diagrammatic representation of the preferred embodiment of my invention.

In practicing my invention I provide an exciter generator 10 for energizing the main field windings of a plurality of main generators 12, 14, 16 and 18. The generators 12, 14, 16 and 18 each has an auxiliary compounding field winding which is connected to be energized by another exciter generator 20. The exciter generator 20 is connected to be excited in accordance with the load on one of the main generators 12, 14, 16 and 18 or, alternatively, in accordance with the total load on the generators.

The energization of the main field windings of the generators 12, 14, 16 and 18 may be varied by adjusting a rheostat 22 to vary the output potential of the exciter generator 10. At the same time, the rheostat 22 varies the output potential of the exciter generator 20 and thereby varies the energization of the compounding field windings of the generators 12, 14, 16 and 18 to provide the desired degree of compounding at the different voltages of the main generators.

The desired load division between the main generators is provided by a series differential field winding in circuit with each of the main generator armatures to provide a drooping voltage-load characteristic for each of the main generators.

Referring to the drawing for a more detailed description of the invention, the main generator 12, for example, has an armature 24 and a differential series field winding 26 connected in series circuit relation through suitable circuit breakers 28 and 30 to a main supply bus X—Y. The generator 12 is also provided with a main field winding 32 which is connected through a variable resistor 34 and disconnect switches 36 and 38 to the conductors 42 and 44 which, in turn, are connected to the armature 46 of the exciter generator 10. The generator 12 is also providing with a compounding field winding 48 which is connected in circuit with a variable resistor 50 and disconnect switches 52 and 54 with the conductors 56 and 58 which are energized by the exciter generator 20.

The differential series field winding 26 may be connected by disconnect switches 64 and 66 to the conductors 68 and 70 which, in turn, are connected to the field winding 72 of the exciter generator 20 in series circuit relation with the resistor 62 of the rheostat 22.

Each of the main generators 14, 16 and 18 has a differential series field winding, a main field winding and a compounding field winding and associated adjustable resistors, disconnect switches and circuit breakers to provide the same circuit relations with the exciter generators 10 and 20 and the main power bus X—Y, as were described in connection with the main generator 12. Thus any number of generators may be connected to the power bus X—Y and the associated equivalent of each of the generators connected to supply power to the bus X—Y may be put into operation by the disconnect switches shown and hereinbefore described. It will be necessary to connect the series field windings of only one of the main generators to the conductors 68 and 70 to provide energization for the field winding 72 of the exciter generator 20. The exciter generators 10 and 20 may be continuously driven by any suitable motive power such as motors 102 and 74, as shown.

A selective shunt 76 is provided as an alternative method of supplying excitation potential for the exciter generator 20. The selective shunt 76 comprises a series of shunt elements 78, 80, 82 and 84 connected in series circuit as part of the bus Y. These shunt elements may be bypassed by the circuit shown by actuating the movable contact element 86 into engagement with the fixed contact element 88. The movable contact element 86 may also be actuated into engagement with the fixed contact element 90 when it is moved from engagement with the fixed contact element 88. The conductor 68 is connected to the contact element 90. A movable selector contactor 91 is connected by a conductor 92 to one side of the shunt element 78, as shown, and is so mounted as to permit movement into engagement with fixed contact elements 94, 96 and 98, which are connected by the conductors indicated to the adjacent ends of the shunt elements 84—82, 82—80, and 80—78, respectively. The conductor 70 is connected to the other end of the shunt element 84 as shown.

Thus there are provided circuits for selectively connecting the field winding 72 of the exciter generator 20 through its associated conductors 68 and 70 across selected ones of the shunt elements 78, 80, 82 and 84. When the contact element 91 is moved to the position indicated by the reference numeral 100, it will be seen that the conductors 68 and 70 are connected across all four of the shunt elements. When the contact element 91 is in engagement with contact element 98, the conductors 68 and 70 will be connected across only the shunt elements 80, 82 and 84. This selector shunt arrangement is provided so that any number of the main generators may be connected to the power bus X—Y and the exciter generator 20 may be provided with the same excitation for a given load per main generator so connected regardless of the number of main generators that are in service.

Thus, for instance, if all of the main generators are connected to the power bus X—Y as indicated, the contact element 91 will be moved to engagement with the contact element 94, as indicated, the contact element 86 will be moved into engagement with the contact element 90, all of the series differential field windings will be disconnected from the conductors 68 and 70, and the field winding 72 will then receive its energization from the potential drop across the single shunt element 84. When fewer main generators are to be connected to the power bus X—Y, a greater number of shunts will be connected by actuation of the selector element 91 to energize the field winding 72. The shunt elements 78, 80, 82 and 84 will have different values of resistance and these values of resistance will be such as to provide the same potential drop across the selected number of shunt elements for a given load for each main generator connected to the power bus X—Y, regardless of the number of main generators in service.

The field winding 104 of the exciter generator 10 is connected to any suitable source of direct current power through the resistor 106 of the rheostat 22. The rheostat 22 is manually operated by an operating handle 108 which is arranged to simultaneously vary the resistors 62 and 106.

In the operation of the system, the main field windings 32 of the main generators 12, 14, 16 and 18 receive their energization from the exciter generator 10 and this energization may be varied by the rheostat 22 to vary the output potentials of the main generators. The compounding windings of the main generators, such as winding 48 of generator 12, will receive their energization from the exciter generator 20 and this energization will vary in accordance with the variations of load on the one of the main generators whose series differential field winding is connected to the conductors 68 and 70 or alternatively with the total load on all of the generators connected to the power bus X—Y in the event that the selective shunt 76 is employed as the source of energization of the field winding 72 of the exciter generator 20.

The series differential field windings provide a drooping voltage-load characteristic for each of the main generators, thus assuring substantially equal load division between the generators, assuming that the generators are of substantially the same design. However, the voltage-load characteristic of the generators as a group will be determined by the relative values of excitation of the generators provided by the main field winding, the compounding field winding and the series differential field winding. Thus by so adjusting the variable resistors, such as the variable resistors 34 and 50 of the main generator 12, such relative values of excitation provided by the main field windings and compounding field windings may be provided as will give to each of the main generators a flat voltage-load characteristic or a rising or drooping voltage-load characteristic.

If now we assume that the resistors 34, 50, 62 and 106 are so adjusted as to provide a flat voltage-load characteristic for the generators at full load and full generator potential, it will be seen that if it is desired that this same flat voltage-load characteristic be present at a lower main generator potential, it will be necessary to decrease the energization of the compounding windings of the main generators at the same time that the energization of the main field windings of the generators is reduced to provide the reduced generator potential. This is necessary since, if the main field excitation of the generators were reduced without reducing the compound field excitation, the compounding excitation at the lower main generator voltage would be greatly out of proportion to the main field excitation and this would result in a rising voltage-load characteristic at the lower main generator potentials. This variation of the compounding field winding energization simultaneously with the variation of the main field energization is provided by the rheostat 22 which simultaneously varies the resistors 62 and 106 as hereinbefore described.

It is to be understood that the variation of the energization of the main field winding 32 may also be provided by connecting the resistor 106 in series circuit relation with the armature 46 of the exciter generator 10 and providing a constant excitation for the exciter generator 10, and likewise, variation of the energization of the compounding winding 48 may be provided by inserting the resistor 62 in circuit with the armature 60 of the exciter generator 20 instead of in series circuit with its field winding 60. If the resistor 62 is connected in the armature circuit of the exciter generator 20, however, it will be necessary to provide a different value of resistance of resistor 62, or to provide a different resistor for each different number of generators in service since the total field current of the generators will be different for each different total number of generator fields energized. It is also to be understood that either rising, flat or drooping voltage-load characteristics may be provided for the main generators as a group by the proper relative adjustment of the resistors 62 and 106, 34 and 50. The resistors 62 and 106 may also be so designed as to give one type of compounding at full main generator potential and different or modified characteristics at other main generator potentials. The main generators may be continuously driven by any suitable motive power either individually or mechanically connected together.

It is to be understood further that the control system herein described is equally applicable to direct current motors where it is desired that they divide a common load in a predetermined manner and for predetermined and adjustable speed-load characteristics at different operating speeds.

Thus it will be seen that I have provided an operating system for a plurality of dynamo-electric machines which will function to divide the load between the machines, to provide a wide range of voltage variation, and to produce predetermined voltage-load characteristics at the several voltages throughout the range of voltage variation of the machines.

In compliance with the requirements of the patent statutes, I have shown and described herein a preferred embodiment of my invention. It is to be understood, however, that the invention is not limited to the precise construction shown and described, but may be modified by one skilled in the art, the construction herein shown and described being merely illustrative of the preferred embodiment of my invention.

I claim as my invention:

1. In a control system for a plurality of generators having their armatures connected in parallel to a common load, means providing a main excitation for the generators, means providing an auxiliary cumulative excitation for the generators proportional to the total load on the plurality of generators, means for simultaneously varying the main and auxiliary cumulative excitations, and means providing an auxiliary differential excitation for each of the generators proportional to its load.

2. In a control system for a plurality of generators having their armatures connected in parallel to a common load, means providing a main excitation for the generators, means providing an auxiliary cumulative excitation for the generators proportional to the total load on the plurality of generators, means for simultaneously varying the main and auxiliary cumulative excitations, and means providing an auxiliary differential excitation for each of the generators proportional to its load, and means for selectively varying the relative values of the several excitations of each of the generators.

3. In combination, a generator, a main excitation means for said generator, an auxiliary excitation means for said generator, means varying the amount of excitation provided by said auxiliary excitation means in proportion to the amount of load on said generator, and means for simultaneously varying the amount of excitation provided by said main and auxiliary excitation means.

4. In combination, a generator, a main excitation means for said generator, an auxiliary excitation means for said generator, means varying the amount of excitation provided by said auxiliary excitation means in proportion to the amount of load on said generator, means for simultaneously varying the amount of excitation provided by said main and auxiliary excitation means, and means for selectively varying the relative amounts of main and auxiliary excitation.

5. In combination, a main generator having a main field winding and an auxiliary field winding, a main exciter generator connected to energize said main field winding, an auxiliary exciter generator connected to energize said auxiliary field winding cumulatively with respect to the excitation of said main field winding, means for varying the potential of the auxiliary exciter generator in accordance with the load on said main generator, and means for simultaneously varying the output potentials of said main exciter generator and said auxiliary exciter generator.

6. In combination, a main generator having a main field winding and an auxiliary field winding, a main exciter generator connected to energize said main field winding, an auxiliary exciter generator connected to energize said auxiliary field winding cumulatively with respect to the excitation of said main field winding, means for varying the potential of the auxiliary exciter generator in accordance with the load on said main generator, means for simultaneously varying the output potentials of said main exciter generator and said auxiliary exciter generator, and means for varying the ratio of main and auxiliary excitation of said main generator.

7. In combination, a plurality of main generators each having a main field winding, an auxiliary cumulative field winding and an auxiliary differential field winding and having their armatures connected in parallel to a common load, a main exciter generator connected to energize said main field windings, an auxiliary exciter generator connected to energize said auxiliary cumulative field windings, means for varying the excitation of said auxiliary exciter generator in accordance with the load on said main generators, means for simultaneously varying the potentials applied to said main and auxiliary cumulative field windings by said main and auxiliary exciter generators, respectively, and means for energizing each of said auxiliary differential field windings in accordance with the load on its associated main generator.

8. In combination, a plurality of generators connected to a common load, means providing a first variable substantially constant excitation for each of said generators, means providing a second excitation for each of said generators proportional to the load on the generators, and means providing a third excitation for each of the generators proportional to the load on that generator.

9. In combination, a plurality of generators connected to a common load, means providing a first variable substantially constant excitation for each of said generators, means providing a second excitation for each of said generators proportional to the load on the generators, means providing a third excitation for each of the generators proportional to the load on that generator, and means for simultaneously varying the amounts of said first and second excitations.

10. In combination, a generator having a main field winding and an auxiliary field winding, means for varying the energization of said auxiliary field winding in accordance with variations of the load on said generator, and other means for simultaneously varying the energization of said main and auxiliary field windings.

11. In a control system for a plurality of main generators connected to a common load and each having a main field winding and first and second auxiliary field windings, first and second exciter generators for energizing said main and said first auxiliary field windings, respectively, means providing a substantialy constant adjustable excitation for said first exciter generator, means providing excitation for said second exciter generator proportional to the load on said main generators, means for simultaneously adjustably varying the energization of said main and first auxiliary field windings provided by said first and second exciter generators, and means providing excitation for each of said second auxiliary windings proportional to the load on its associated main generators.

12. In a control system for a plurality of main generators connected to a common load and each having a main field winding and first and second auxiliary field windings, first and second exciter generators for energizing said main and said first auxiliary field windings respectively, means providing a substantially constant adjustable excitation for said first exciter generator, means connecting said second exciter generator to be excited in accordance with the load current of one of said generators, means for simultaneously varying the energization of said main and first auxiliary field windings provided by said first and second exciter generators, and means providing excitation for each of said second auxiliary windings proportional to the current load on its associated main generator.

13. In a control system for a plurality of main generators connected to a common load and each having a main field winding and an auxiliary field winding, first and second exciter generators for energizing said main and auxiliary field windings respectively, means providing a substantially constant adjustable excitation for said first exciter generator, means connecting said second exciter generator to be excited in accordance with the current load on said generators, means for simultaneously varying the energization of said main and auxiliary field windings provided by said first and second exciter generators, and means providing a predetermined load division between said main generators.

14. In a control system for a plurality of main generators connected to a common load and each having a main field winding and an auxiliary field winding, means providing a substantially constant adjustable energization for said main field windings, an exciter generator for energizing said auxiliary field windings, a shunt connected in the load circuit between said main generators and their common load, means connecting the field winding of said exciter generator across said shunt, means for simultaneously adjusting the energization of said main and auxiliary field windings, and means providing a predetermined load division between said main generators.

15. In a control system for a plurality of main generators each having a main field winding and an auxiliary field winding, means providing a substantially constant adjustable energization for said main field windings, an exciter generator for energizing said auxiliary field windings, circuit means for connecting any number of the main generators to a common load, a shunt connected in the load circuit between the generators and the load, means for selectively connecting such portions of said shunt in circuit with the field winding of said exciter generator as will provide substantially the same excitation for the exciter generator at a given load per generator regardless of the number of generators connected to the load.

16. In a control system for a plurality of main generators each having a main field winding and an auxiliary field winding, means providing a substantially constant adjustable energization for said main field windings, an exciter generator for energizing said auxiliary field windings, circuit means for connecting any number of the main generators to a common load, a shunt connected in the load circuit between the generators and the load, means for selectively connecting such portions of said shunt in circuit with the field winding of said exciter generator as will provide substantially the same excitation for the exciter generator at a given load per generator regardless of the number of generators connected to the load, and means automatically providing a predetermined load division between the main generators that are connected to the load.

17. In a control system for a plurality of dynamo-electric machines connected to a common load, means providing a main excitation for the machines, means providing an auxiliary cumulative excitation for the machines proportional to the total load on the plurality of machines, means for simultaneously varying the main and auxiliary cumulative excitations, and means providing an auxiliary differential excitation for each of the machines proportional to its load.

18. In combination, a dynamo-electric machine, a main excitation means for said machine, an auxiliary excitation means for said machine, means automatically varying the amount of excitation provided by said auxiliary excitation means in proportion to the amount of load on said machine, and means for simultaneously varying the amount of excitation provided by said main and auxiliary excitation means.

19. In combination, a plurality of dynamo-electric machines connected to a common load and each having a main field winding, an auxiliary cumulative field winding and an auxiliary differential field winding, a main exciter generator connected to energize said main field windings, an auxiliary exciter generator connected to energize said auxiliary cumulative field windings, means for automatically varying the excitation of said auxiliary exciter generator in accordance with the load on said dynamo-electric machines, means for simultaneously varying the potentials applied to said main and auxiliary cumulative field windings by said main and auxiliary exciter generators respectively, and means for energizing each of said auxiliary differential field windings in accordance with the load on its associated dynamo-electric machine.

ALONZO F. KENYON.